US012539829B2

(12) United States Patent
Chaudhari et al.

(10) Patent No.: US 12,539,829 B2
(45) Date of Patent: Feb. 3, 2026

(54) SENSOR ASSEMBLY WITH BAFFLES

(71) Applicant: Ford Global Technologies, LLC, Dearborn, MI (US)

(72) Inventors: Kunal Chaudhari, Westland, MI (US); Michael Robertson, Jr., Garden City, MI (US); Rashaun Phinisee, Ypsilanti, MI (US); Venkatesh Krishnan, Canton, MI (US); Anthony Michael Regalbuto, Highland, MI (US); Mallikarjun Sukumar, Chennai (IN)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 18/334,448

(22) Filed: Jun. 14, 2023

(65) Prior Publication Data

US 2024/0416871 A1  Dec. 19, 2024

(51) Int. Cl.
| | |
|---|---|
| G02B 27/00 | (2006.01) |
| B60S 1/54 | (2006.01) |
| G01D 11/24 | (2006.01) |
| G01S 7/40 | (2006.01) |
| G01S 7/497 | (2006.01) |
| G01S 13/931 | (2020.01) |

(52) U.S. Cl.
CPC ............. *B60S 1/54* (2013.01); *G01D 11/245* (2013.01); *G02B 27/0006* (2013.01); *G01S 7/4043* (2021.05); *G01S 2007/4977* (2013.01); *G01S 2013/9323* (2020.01); *G01S 2013/93273* (2020.01)

(58) Field of Classification Search
CPC ....... B60S 1/54; G01D 11/245; G01S 7/4043; G02B 27/0006
See application file for complete search history.

(56) References Cited

U.S. PATENT DOCUMENTS

| | | | |
|---|---|---|---|
| 10,220,817 B2 * | 3/2019 | Rice | B60S 1/56 |
| 10,928,225 B1 * | 2/2021 | Krishnan | B60S 1/54 |
| 10,981,518 B1 * | 4/2021 | Krishnan | H04N 7/18 |
| 2009/0250533 A1 * | 10/2009 | Akiyama | B60S 1/381 |
| | | | 239/284.1 |
| 2017/0225660 A1 * | 8/2017 | Trebouet | G01S 17/93 |
| 2020/0247329 A1 * | 8/2020 | Robertson, Jr. | B60R 11/00 |
| 2021/0086727 A1 * | 3/2021 | Bopp | B08B 3/02 |
| 2021/0088668 A1 * | 3/2021 | Hahn | G01S 7/4813 |

FOREIGN PATENT DOCUMENTS

| | | | | |
|---|---|---|---|---|
| DE | 10012004 A1 * | 9/2001 | | B60S 1/0822 |
| FR | 3027006 A1 * | 4/2016 | | G03B 11/043 |
| FR | 3047456 B1 * | 3/2018 | | G01S 17/93 |
| JP | 2009286216 A * | 12/2009 | | B60S 1/56 |
| JP | 2011244417 A * | 12/2011 | | B60S 1/56 |
| JP | 2012175359 A * | 9/2012 | | |
| WO | 2019238764 A1 | 12/2019 | | |

* cited by examiner

*Primary Examiner* — Jamel E Williams
(74) *Attorney, Agent, or Firm* — Frank A. MacKenzie; Brooks Kushman P.C.

(57) ABSTRACT

A sensor assembly includes a sensor having a lens defining an axis. An air nozzle is aimed to direct air across the lens and defines a direction of airflow along a longitudinal axis of the air nozzle. The longitudinal axis is transverse to the axis. A plurality of baffles are disposed in the air nozzle and spaced from each other. The baffles extend partially across the air nozzle relative to the axis.

20 Claims, 7 Drawing Sheets

SENSOR ASSEMBLY WITH BAFFLES

BACKGROUND

Autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
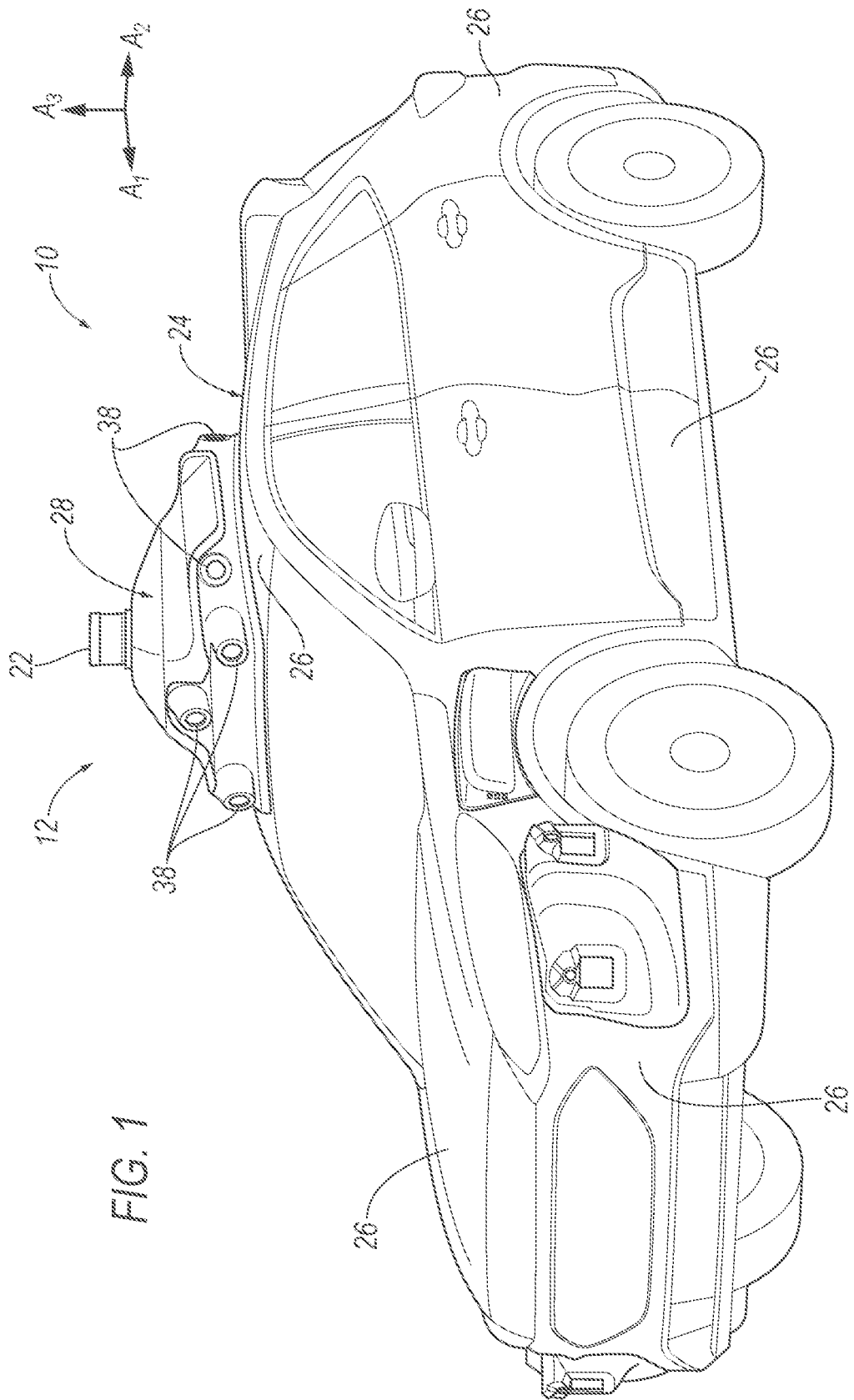
FIG. 1 is a perspective view of a vehicle including an example sensor assembly mounted to a roof.

A sensor assembly includes a sensor having a lens defining an axis. An air nozzle is aimed to direct air across the lens and defines a direction of airflow along a longitudinal axis of the air nozzle. The longitudinal axis is transverse to the axis. A plurality of baffles are disposed in the air nozzle and spaced from each other. The baffles extend partially across the air nozzle relative to the axis.

The baffles may be tapered in a direction opposite the direction of airflow. The baffles may be tapered along the axis.

The air nozzle may include sides spaced from each other along the axis. The plurality of baffles may extend from one side towards the other side.

The baffles may define respective baffle longitudinal axes extending substantially parallel to the longitudinal axis of the air nozzle.

The air nozzle may define a second axis transverse to the longitudinal axis and the axis. The respective baffles may extend partially across the air nozzle relative to the second axis. The baffles may be spaced from each other along the second axis. The baffles may include respective widths extending along the second axis. The respective widths may be substantially identical.

The air nozzle may include a top and a bottom spaced from each other along the second axis. The baffles may be spaced from the top and the bottom.

The air nozzle may include an inlet and an outlet spaced from each other along the longitudinal axis. The plurality of baffles may be disposed closer to the outlet than to the inlet. The baffles may be spaced from the outlet along the longitudinal axis.

The baffles may include respective outlet surfaces facing the outlet. The outlet surfaces may extend substantially parallel to the outlet. The baffles may include respective inlet surfaces facing the inlet. The inlet surfaces may extend substantially parallel to the outlet surfaces.

The baffles may include respective heights extending along the axis. The respective heights may be substantially identical.

The baffles may include respective lengths extending along the longitudinal axis. The respective lengths may be substantially identical.

The plurality of baffles maybe mirror images of each other about the longitudinal axis.

The air nozzle may be shaped to discharge air in a flat-fan pattern.

The sensor assembly may include a fluid nozzle aimed to direct fluid across the lens. The fluid nozzle may be circumferentially spaced from the air nozzle about the axis.

With reference to the Figures, wherein like numerals indicate like parts throughout the several views, a sensor assembly 12 for a vehicle 10 includes a sensor 14 having a lens 16 defining an axis A. An air nozzle 18 is aimed to direct air across the lens 16 and defines a direction of airflow D along a longitudinal axis L of the air nozzle 18. The longitudinal axis L is transverse to the axis A. A plurality of baffles 20 are disposed in the air nozzle 18 and spaced from each other. The baffles 20 extend partially across the air nozzle 18 relative to the axis A.

The sensor assembly 12 uses fluid for cleaning the lens 16 of the sensor 14, which can improve the quality of data gathered by the sensor 14. Additionally, the sensor assembly 12 uses air for cleaning and/or drying the lens 16 of the sensor 14, e.g., by pushing debris and/or liquid droplets off the sensor 14. Advantageously, the baffles 20 divert air in concentrated flow paths, e.g., towards edges of the lens 16, which assists in pushing debris and/or liquid droplets off the entire lens 16. Diverting the air in concentrated flow paths creates flow entirely across the lens 16 and allows air to exit the air nozzle 18 at a velocity sufficient to clean and/or dry the lens 16 of the sensor 14.

With reference to FIG. 1, the vehicle 10 may be any passenger or commercial automobile such as a car, a truck, a sport utility vehicle, a crossover, a van, a minivan, a taxi, a bus, etc.

The vehicle 10 defines a longitudinal axis $A_1$, e.g., extending between a front and a rear of the vehicle 10. The vehicle 10 defines a lateral axis $A_2$, e.g., extending between a left side and a right side of the vehicle 10. The vehicle 10 defines a vertical axis $A_3$, e.g., extending between a top and a bottom of the vehicle 10. The longitudinal axis $A_1$, the lateral axis $A_2$, and the vertical axis $A_3$ are perpendicular to each other.

The vehicle 10 may be an autonomous or semi-autonomous vehicle. A vehicle computer can be programmed to operate the vehicle 10 independently of the intervention of a human driver, completely or to a lesser degree. The vehicle computer may be programmed to operate a propulsion, brake system, steering, and/or other vehicle systems based at least in part on data received from one or more sensors 14, as well as a scanning sensor 22 described below. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 10 includes a body 24. The vehicle 10 may be of a unibody construction, in which a frame and the body 24 of the vehicle 10 are a single component. The vehicle 10 may, alternatively, be of a body-on-frame construction, in which the frame supports the body 24 that is a separate component from the frame. The frame and body 24 may be formed of any suitable material, for example, steel, aluminum, etc.

The body 24 includes body panels 26 partially defining an exterior of the vehicle 10. The body panels 26 may present a class-A surface, e.g., a finished surface exposed to view by a customer and free of unaesthetic blemishes and defects. The body panels 26 include, e.g., a roof, etc.

The sensor assembly 12 includes a housing 28 that is attachable to the vehicle 10, e.g., to one of the body panels 26 of the vehicle 10, e.g., the roof. The sensors 14 and the scanning sensor 22 are supported by and/or disposed in the housing 28. The housing 28 may be shaped to be attachable to the roof, e.g., may have a shape matching a contour of the roof. The housing 28 may be attached to the roof, which can provide the sensors 14 and the scanning sensor 22 with an unobstructed field of view of an area around the vehicle 10. The housing 28 may be formed of, e.g., plastic or metal.

Figure 2:
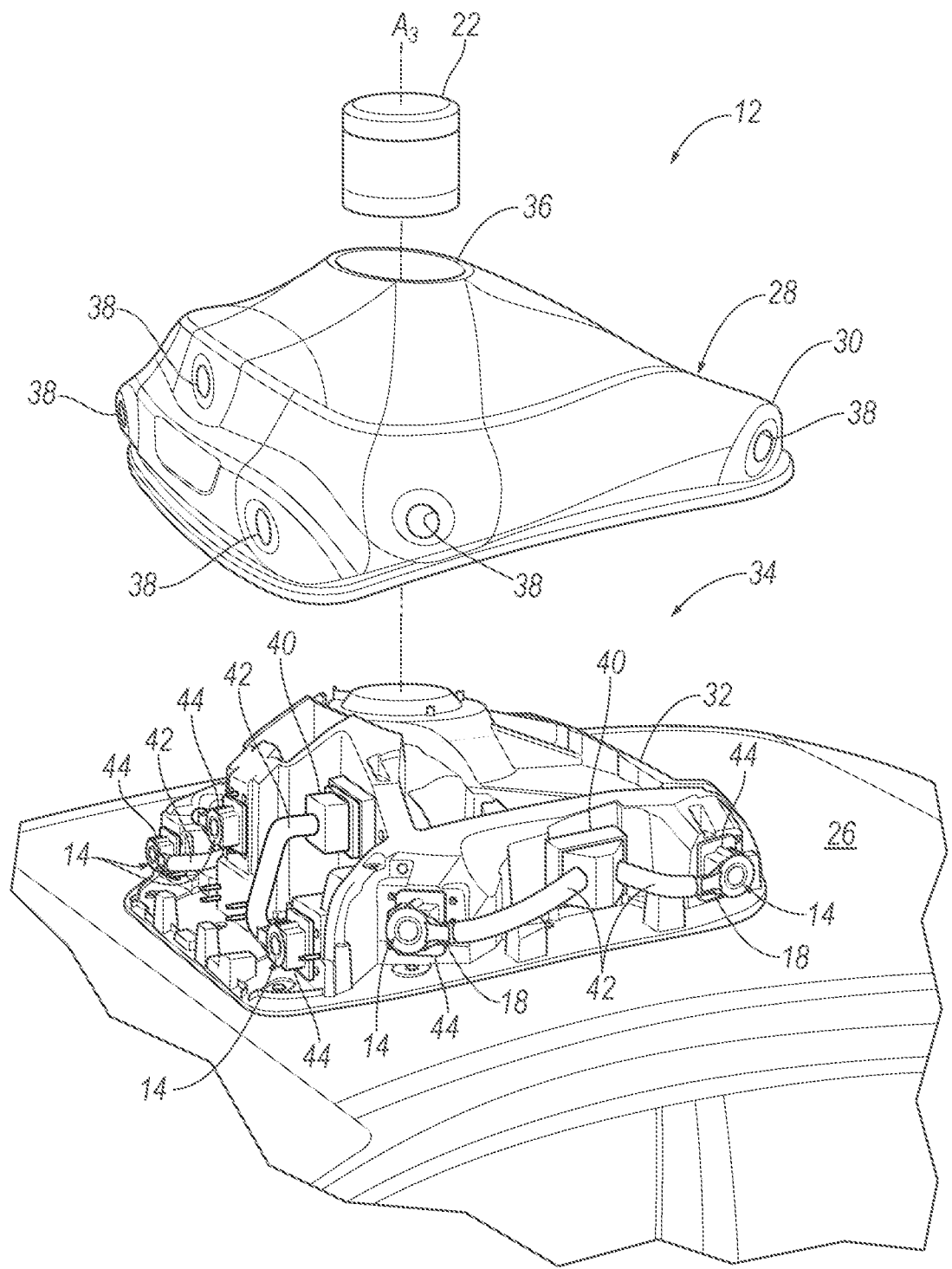
FIG. 2 is an exploded view of the sensor assembly including a housing lower piece and a housing upper piece.

With reference to FIG. 2, the housing 28 includes a housing upper piece 30 and a housing lower piece 32. The housing upper piece 30 and the housing lower piece 32 are shaped to fit together, with the housing upper piece 30 fitting on top of the housing lower piece 32. The housing upper piece 30 covers the housing lower piece 32. The housing 28 may enclose and define a chamber 34; for example, the housing upper piece 30 and the housing lower piece 32 may enclose and define the chamber 34. The housing 28 may shield contents of the chamber 34 from external elements such as wind, rain, debris, etc.

The housing upper piece 30 includes a central opening 36 that exposes the housing lower piece 32. The central opening 36 is round, e.g., has a circular or slightly elliptical shape. The housing upper piece 30 and the housing lower piece 32 are each monolithic. For the purposes of this disclosure, "monolithic" means a single-piece unit, i.e., a continuous piece of material without any fasteners, joints, welding, adhesives, etc., fixing multiple pieces to each other. For example, the housing upper piece 30 and the housing lower piece 32 may be stamped or molded as a single piece.

With continued reference to FIG. 2, the housing upper piece 30 may include apertures 38. The apertures 38 are holes in the housing upper piece 30 leading from the chamber 34 into the ambient environment. That is, the apertures 38 extend through the housing upper piece 30. The apertures 38 may be any suitable shape, e.g., circular. The housing upper piece 30 includes one aperture 38 for each sensor 14. Each sensor 14 has a field of view received through the respective aperture 38. For example, the sensors 14 may extend into the respective apertures 38. In such an example, the aperture 38 may be concentric about a portion of the sensor 14, e.g., the lens 16.

With continued reference to FIG. 2, the sensor assembly 12 includes a blower 40 positioned to direct air across one sensor 14. The blower 40 is supported by the housing lower piece 32. For example, the blower 40 may be mounted to the housing lower piece 32. For example, the blower 40 may include locating elements, fasteners, etc., that engage the housing lower piece 32. Additionally, or alternatively, fasteners may engage the blower 40 and the housing lower piece 32 to mount the blower 40 to the housing lower piece 32.

The blower 40 may include an electric motor, a fan, or other suitable structure for moving air. The blower 40 moves air towards the one sensor 14, e.g., between an intake and an exhaust. The blower 40 may be configured to draw air via the intake and exhaust air via the exhaust towards the one sensor 14. The intake of the blower 40 is in fluid communication with the chamber 34, and the exhaust of the blower 40 is in fluid communication with a duct 42. That is, the blower 40 pulls air from the chamber 34 and urges air to flow out of the exhaust, through the duct 42, to (and out of) the air nozzle 18, and across the lens 16 of the one sensor 14.

The blower 40 may be coupled to and in fluid communication with any suitable number of ducts 42, e.g., one or more. As one example, the blower 40 may be coupled to and in fluid communication with one duct 42. In such an example, the blower 40 may blow air into the duct 42, e.g., such that the blower 40 creates a positive pressure in the duct 42. As another example, the blower 40 may be coupled to and in fluid communication with two ducts 42. In such an example, the blower 40 may blow air into both ducts 42, e.g., such that the blower 40 creates a positive and equal pressure in the two ducts 42.

The sensor assembly 12 may include any suitable number of blowers 40. For example, the sensor assembly 12 may include one blower 40 for each sensor 14. In such an example, each blower 40 may blow air across one respective sensor 14. As another example, the sensor assembly 12 may include fewer blowers 40 than sensors 14, as shown in FIG. 2. In such an example, at least some of the blowers 40 may blow air across a respective plurality of sensors 14.

With continued reference to FIG. 2, the sensor assembly 12 may include a same number of ducts 42 as sensors 14. The sensors 14 may be spaced from each other within the chamber 34 such that each duct 42 extends toward one respective sensor 14. Each duct 42 extends from one blower 40 to one air nozzle 18. Specifically, each duct 42 is coupled to one blower 40 and one air nozzle 18. That is, each duct 42 is fluidly connected to one blower 40 such that air exhausted by the blower 40 enters the duct 42 and is fluidly connected to one air nozzle 18 such that air exhausted by the duct 42 enters the air nozzle 18. Said differently, each duct 42 receives air from one blower 40, e.g., the exhaust, and directs air to one respective air nozzle 18.

The ducts 42 are disposed in the chamber 34. The ducts 42 may be supported by the housing 28, as shown in FIG. 2. For example, the ducts 42 may be fixed to the housing lower piece 32, e.g., via fasteners, clips, adhesives, etc. The ducts 42 define respective flow paths from the corresponding blower 40 to the corresponding air nozzle 18. A cross-sectional area of each duct 42 normal to the flow path may, for example, be uniform from the corresponding blower 40 to the corresponding air nozzle 18, e.g., to maintain a speed of the air flowing through the respective duct 42. As another example, the cross-sectional area may vary between the corresponding blower 40 to the corresponding air nozzle 18, e.g., to change the speed of the air flowing through the respective duct 42.

With continued reference to FIG. 2, the sensor assembly 12 includes the sensors 14 and the scanning sensor 22. The sensors 14 may detect the location and/or orientation of the vehicle 10. For example, the sensors 14 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 14 may detect the external world, e.g., objects and/or characteristics of surroundings of the vehicle 10, such as other vehicles 10, road lane markings, traffic lights and/or signs, pedestrians, etc. For example, the sensors 14 may include radar sensors, scanning laser range finders, light detection and ranging (LIDAR) devices, and image processing sensors such as cameras. The sensors 14 may include communications devices, for example, vehicle-to-infrastructure (V2I) or vehicle-to-vehicle 10 (V2V) devices.

The scanning sensor 22 may be disposed outside the housing 28. The scanning sensor 22 protrudes upward from the housing upper piece 30, as shown in FIGS. 1 and 2. The scanning sensor 22 may be a camera, a LIDAR device, a radar sensor, etc. The scanning sensor 22 is disposed above the housing lower piece 32 to have an unobstructed 360° horizontal field of view. For example, the scanning sensor 22 may be supported by the housing upper piece 30. In this situation, the scanning sensor 22 may extend at least partially through the housing upper piece 30 into the chamber 34, e.g., via the central opening 36. The scanning sensor 22 may be fixed relative to the housing upper piece 30 in the chamber 34, e.g., via fasteners, clips, etc. The scanning sensor 22 may be positioned laterally, i.e., along a left-right dimension relative to the vehicle 10, in a middle of the vehicle 10. The scanning sensor 22 may have a cylindrical shape defining an axis (not shown) that is oriented substantially vertically.

With continued reference to FIG. 2, the sensors 14 may be disposed in the housing 28, specifically in the chamber 34. The sensors 14 may be attached directly to the body panel 26 in the chamber 34, or the sensors 14 may be attached to the housing lower piece 32 in the chamber 34, which in turn is directly attached to the roof. The sensors 14 may be cameras arranged to collectively cover a 360° field of view with respect to a horizontal plane. Each sensor 14 has a field of view through the respective lens 16 and the respective aperture 38, and the field of view of one sensor 14 may overlap the fields of view of the sensors 14 that are circumferentially adjacent to one another, i.e., that are immediately next to each other.

Figure 3:
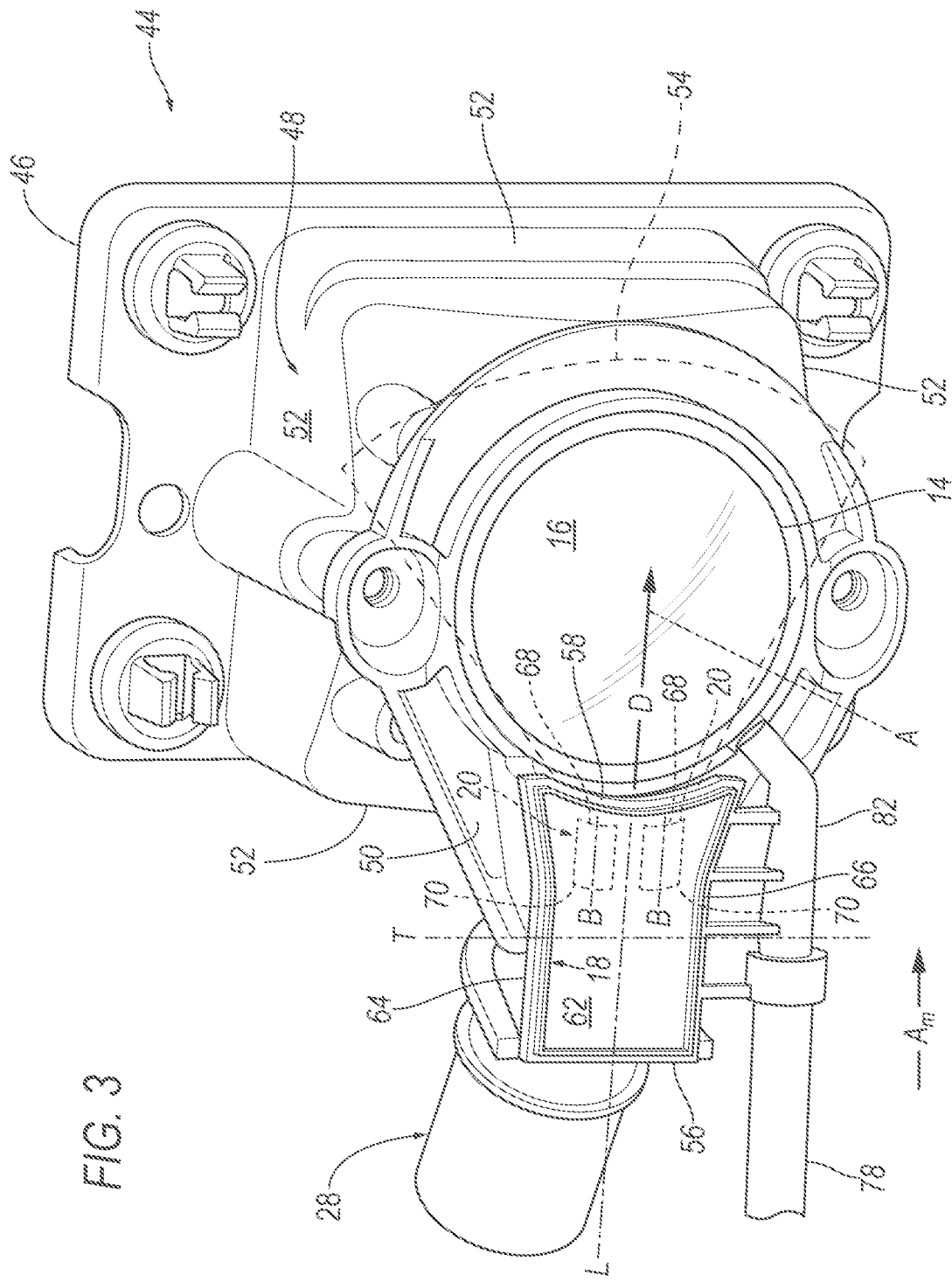
FIG. 3 is a perspective view of an air nozzle directing air across a lens of a sensor.

Turning now to FIG. 3, the sensors 14 include respective lenses 16. Each lens 16 may define the field of view of the respective sensor 14 through the aperture 38. Each lens 16 may be convex. Each lens 16 defines the axis A, around which the lens 16 is radially symmetric. The axis A extends along a center of the field of view of the respective sensor 14.

The sensor assembly 12 may include a plurality of casings 44. Each casing 44 may be disposed in the chamber 34 and mounted to one respective sensor 14. The casing 44 extends completely around the sensor 14. That is, the casing 44 shields the sensor 14 from the chamber 34.

With continued reference to FIG. 3, each casing 44 may include a base portion 46, a tunnel portion 48, and a top panel 50. The tunnel portion 48 extends circumferentially around the axis A. For example, the tunnel portion 48 can include a plurality of flat panels 52, e.g., four flat panels 52, connected together in a circumferential loop around the axis A. The top panel 50 extends parallel to the lens 16, i.e., orthogonal to the axis A defined by the lens 16. The base portion 46 extends radially outward from the tunnel portion 48 relative to the axis A, and the top panel 50 extends radially inward from the tunnel relative to the axis A. The top panel 50 and the base portion 46 can be parallel to each other.

Figure 5A:
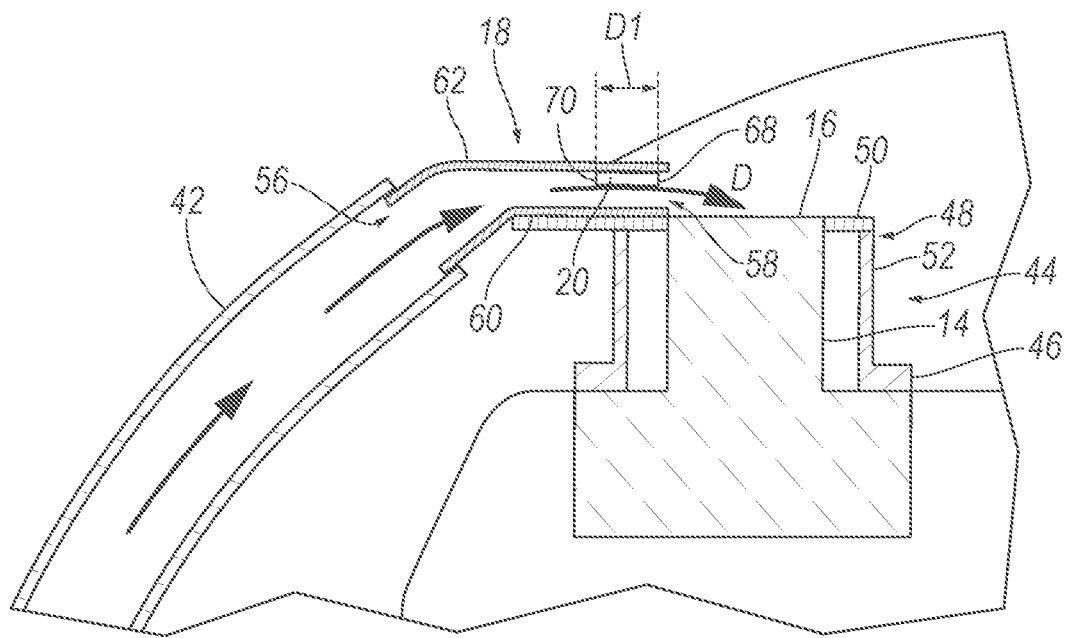
FIG. 5A is a cross-section view along line 5A in FIG. 4A.
Figure 5B:
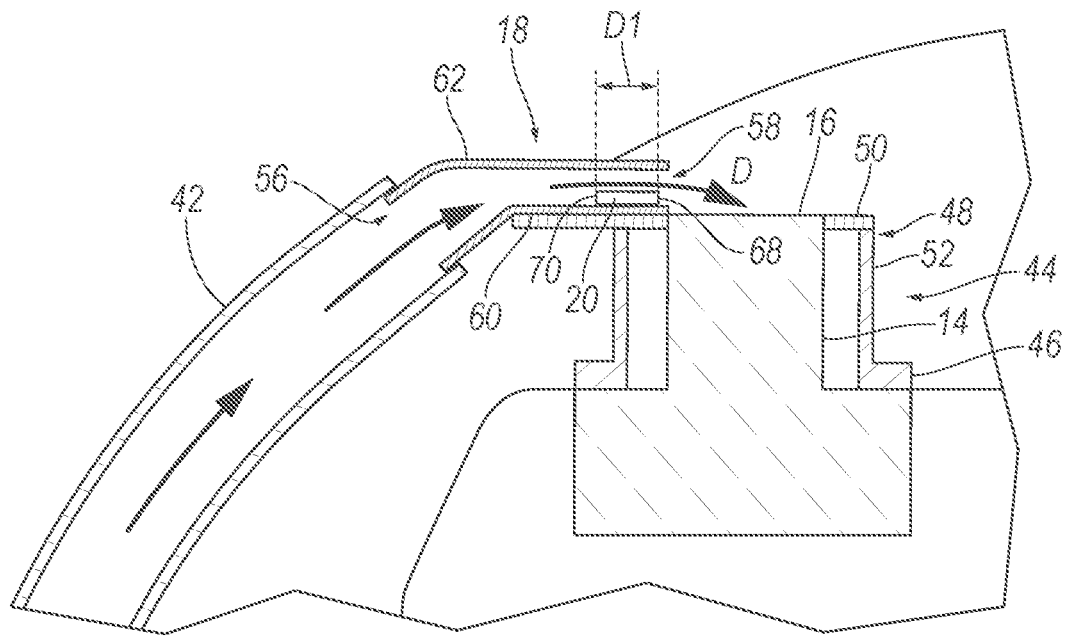
FIG. 5B is a cross-section view along line 5B in FIG. 4B.
Figure 5C:
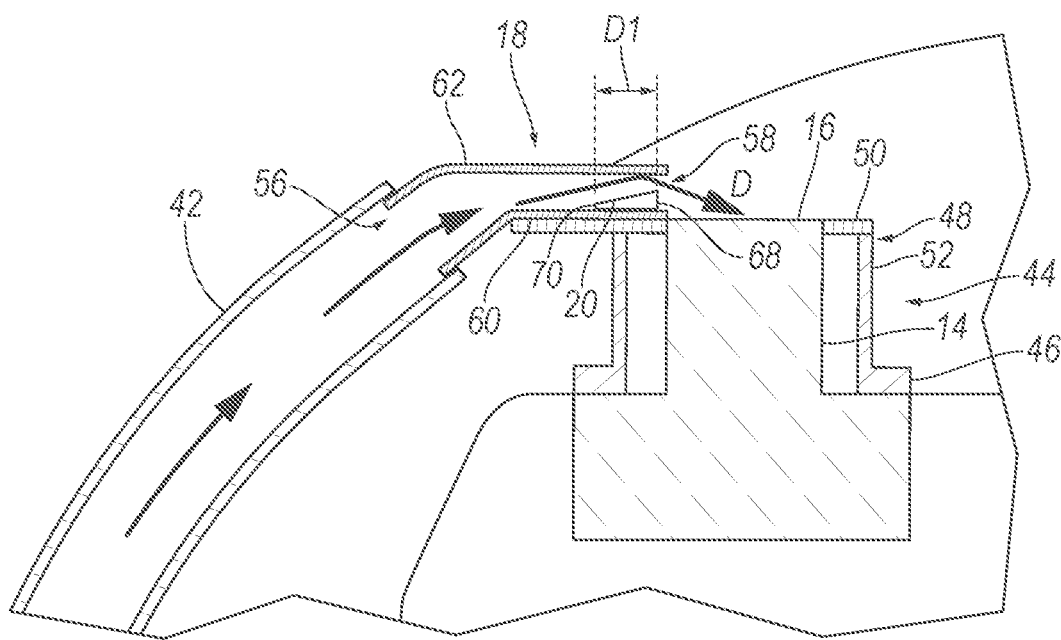
FIG. 5C is a cross-section view along line 5C in FIG. 4C.

The casing 44 is attached to the sensor 14. Specifically, the base portion 46 of the casing 44 is attached to the sensor 14, and the rest of the casing 44 is not attached to the sensor 14, as shown in FIGS. 5A-5C. The base portion 46 is attached to the sensor 14 in any suitable manner, e.g., clips, fasteners, adhesive, etc. The tunnel portion 48 and the top panel 50 hang from the base portion 46 and extend around the lens 16 without being attached directly to the sensor 14 or the lens 16. This arrangement reduces vibrations experienced by the sensor 14.

With continued reference to FIG. 3, the air nozzle 18 may be mounted to the casing 44, specifically to the top panel 50. For example, the top panel 50 may include an overhanging portion extending radially outside the tunnel portion 48 relative to the axis A. The air nozzle 18 may be attached to the overhanging portion in any suitable manner, e.g., clips, fasteners, adhesive, etc.

The air nozzle includes an inlet 56 and an outlet 58 spaced from each other along the longitudinal axis L of the air nozzle 18. The inlet 56 is in fluid communication with the duct 42. That is, the inlet 56 receives air exhausted from the duct 42. The inlet 56 directs air through the air nozzle 18 to the outlet 58.

The outlet 58 is in fluid communication with the lens 16, i.e., exhausts air towards the lens 16. Specifically, the outlet 58 is aimed across and at the lens 16 so that air strikes the lens 16 at a shallow angle, e.g., less than 10°. Additionally, the outlet 58 may be aimed so that the direction of airflow D from the outlet 58 is generally parallel to an ambient airflow $A_m$ during forward motion of the vehicle 10. That is, the air nozzles 18 may be aimed to direct airflow in various directions, e.g., based on a position of a respective sensor 14 relative to the vehicle 10. As used herein, "generally parallel" means that a horizontal component of the airflow from the air nozzle 18 is parallel to the ambient airflow $A_m$ during forward motion of the vehicle 10, even if the airflow from the air nozzle 18 has a vertical component that is transverse to the ambient airflow $A_m$. This arrangement can help minimize interference of the airflow from the air nozzle 18 by the ambient airflow $A_m$ during forward motion of the vehicle 10.

With continued reference to FIG. 3, the air nozzle 18, e.g., the outlet 58, may be shaped to discharge air in a flat-fan pattern 54. For the purposes of this disclosure, a "flat-fan pattern" means that the discharge has an increasing width in one dimension as the discharge moves away from the air nozzle 18 and has a generally flat shape along a plane defined by the width and the direction of airflow D. The direction of airflow D is directed along a center of the spray pattern, i.e., bisecting the flat-fan pattern 54. The direction of airflow D of the air nozzle 18 is in a radially inward direction with respect to the axis A, i.e., a direction that is toward the axis A.

The spray pattern may cause the airflow from the air nozzle 18 to form an air curtain across the lens 16. For the purposes of this disclosure, an "air curtain" means a layer of moving air that has a width significantly greater than a thickness, that is close to a surface, and that is moving generally parallel to the surface. An air curtain can, for example, remove debris from the lens 16 as well as prevent debris from contacting the lens 16. As another example, the air curtain can dry, defog, and/or defrost the lens 16.

The air nozzle 18 defines a second axis T that is transverse to the axis A and the longitudinal axis L. The air nozzle 18 includes a top 64 and a bottom 66 spaced from each other along the second axis T. The top 64 and the bottom 66 extend along the longitudinal axis L from the inlet 56 to the outlet 58.

With continued reference to FIG. 3, the plurality of baffles 20 are disposed in the air nozzle 18. The air nozzle 18 may include any suitable number of baffles 20, e.g., two or more. The baffles 20 may have any suitable size, e.g., dimensions and shape.

The baffles 20 may extend partially across the air nozzle 18 relative to the second axis T. For example, the baffles 20 may be spaced from at least one of the top 64 and the bottom 66. In one example, the baffles 20 may be spaced from the top 64 and the bottom 66, as shown in FIG. 3. In another example, at least one baffle 20 may extend from one of the top 64 or the bottom 66 towards the other of the top 64 or the bottom 66. The baffles 20 may, for example, be spaced from each other along the second axis T, as shown in FIGS. 3-4C.

With continued reference to FIG. 3, the baffles 20 may define respective longitudinal axes B. The longitudinal axes B of the baffles 20 may be generally parallel to the longitudinal axis L of the air nozzle 18. That is, the baffles 20 may extend generally in the direction of the airflow D. The baffles 20 may include respective outlet surfaces 68 facing the outlet 58 and respective inlet surfaces 70 facing the inlet 56. The inlet surfaces 70 are spaced from the corresponding outlet surfaces 68 along the respective longitudinal axis B of the corresponding baffle 20. The outlet surfaces 68 may extend substantially parallel to the outlet 58, e.g., in cross-section relative to the axis A, and the inlet surfaces 70 may extend substantially parallel to the outlet surfaces 68, e.g., in cross-section relative to the axis A.

The baffles 20 are disposed between the inlet 56 and the outlet 58 of the air nozzle 18. The baffles 20 may be disposed closer to the outlet 58 than to the inlet 56. For example, the baffles 20 may be disposed at the outlet 58. That is, the outlet surfaces 68 of the baffles 20 may be aligned with the outlet 58 relative to the longitudinal axis L of the air nozzle 18. As another example, the baffles 20 may be spaced from the outlet 58 along the longitudinal axis L of the air nozzle 18, as shown in FIGS. 3 and 5A-5C.

Figures 4A, 4B:
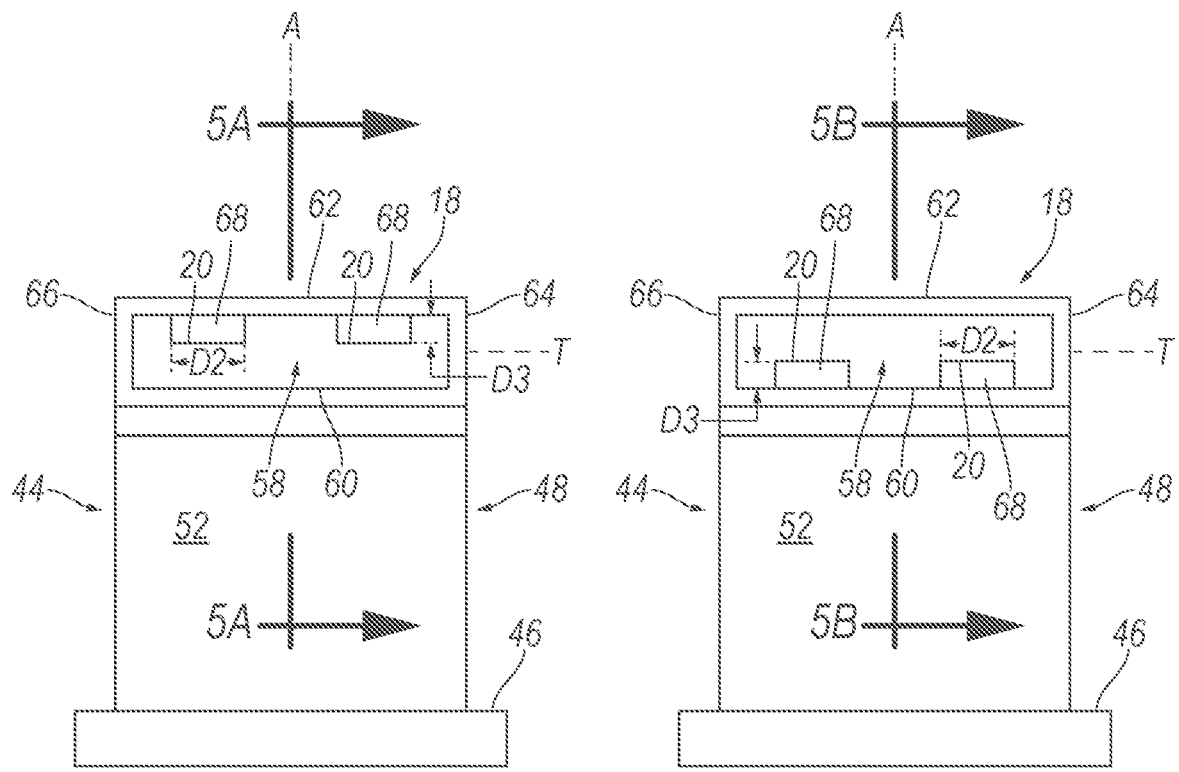
FIG. 4A is a front view of the air nozzle including baffles on one side.
FIG. 4B is a front view of the air nozzle including baffles on the other side.
Figure 4C:
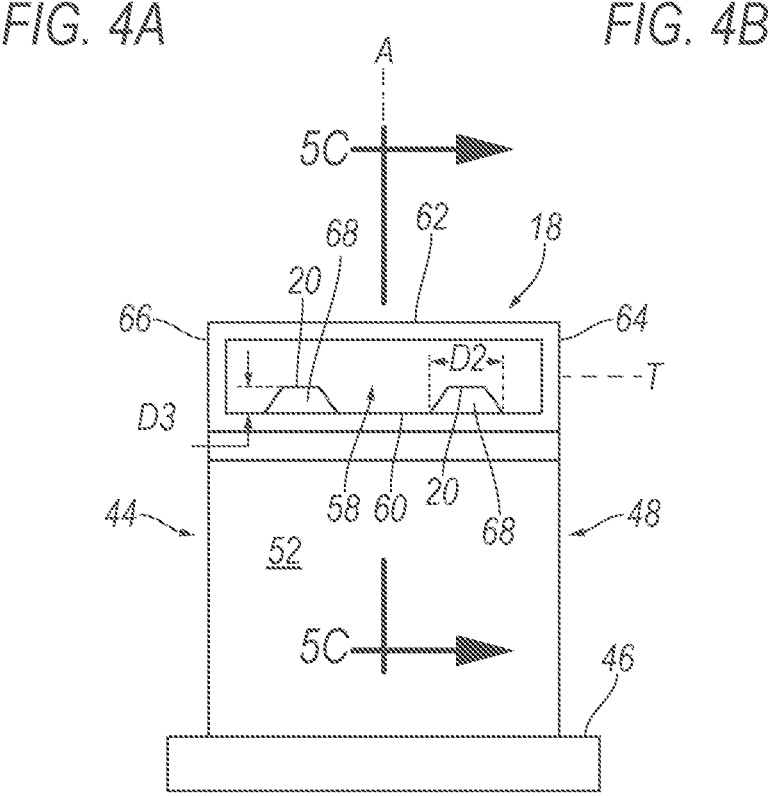
FIG. 4C is a front view of the air nozzle including baffles tapered from one side toward the other side.

Turning now to FIGS. 4A-5C, the air nozzle 18 includes two sides 60, 62 spaced from each other along the axis A, as shown in FIGS. 4A-4C. The sides 60, 62 may each extend from the inlet 56 to the outlet 58 along the longitudinal axis L. The sides 60, 62 may be referred to as a proximal side 60 and a distal side 62 (e.g., where the proximal side 60 is disposed between the distal side 62 and the casing 44 along the axis A). The sides 60, 62 may extend from the top 64 to the bottom 66 along the second axis T.

The plurality of baffles 20 may be disposed on one of the sides 60, 62. As set forth above, the baffles 20 extend partially across the air nozzle 18 relative to the axis A. That is, the plurality of baffles 20 may extend from one of the sides 60, 62 towards the other side 60, 62. For example, the plurality of baffles 20 may be disposed on the proximal side 60, as shown in FIGS. 4B, 4C, 5B, and 5C. As another example, the plurality of baffles 20 may be disposed on the distal side 62, as shown in FIGS. 4A and 5A. Alternatively, at least some of the baffles 20 may be disposed on the proximal side 60 and the other baffles 20 may be disposed on the distal side 62, i.e., the baffles 20 may be spaced from each other along the axis A. In such an example, the baffles 20 may overlap each other relative to the second axis T.

The baffles 20 may be tapered. For example, the baffles 20 may be tapered in a direction opposite the direction of airflow D, as shown in FIG. 5C. That is, the baffles 20 may be tapered in a direction from the outlet 58 to the inlet 56 of the air nozzle 18. Said differently, the height D3 of the baffles 20 may decrease from the respective outlet surfaces 68 towards the respective inlet surfaces 70. Additionally, or alternatively, the baffles 20 may be tapered along the axis A, as shown in FIG. 4C. That is, the width D2 of the baffles 20 may decrease from the one side 60, 62 towards the other side 60, 62. For example, the baffles 20 may be tapered in a direction from the proximal side 60 to the distal side 62. Tapering the baffles 20 may increase the velocity at which the air exits the air nozzle 18.

The baffles 20 may be substantially identical to each other. That is, the baffles 20 may have one or more dimensions that are substantially identical. For example, the baffles 20 include respective lengths D1 extending from the corresponding outlet surface 68 to the corresponding inlet surface 70, as shown in FIGS. 5A-5C. The lengths D1 of the baffles 20 may be substantially identical. As another example, the baffles 20 include respective widths D2 extending along the second axis T, as shown in FIGS. 4A-4C. The widths D2 of the baffles 20 may be substantially identical. As another example, the baffles 20 include respective heights D3 extending along the axis A, as shown in FIGS. 4A-4C. The heights D3 of the baffles 20 may be substantially identical. The baffles 20 may be mirror images of each other relative to the longitudinal axis L of the air nozzle 18.

The air nozzle 18, e.g., the top 64, the bottom 66, the sides 60, 62, and the baffles 20, may be monolithic. As another example, one or more components of the air nozzle 18 may be formed separately and subsequently assembled to one or more other components. The air nozzle 18, i.e., the components thereof, may be any suitable material, e.g., plastic, metal, etc. The components of the air nozzle 18 may be a same or different material.

Figure 6:
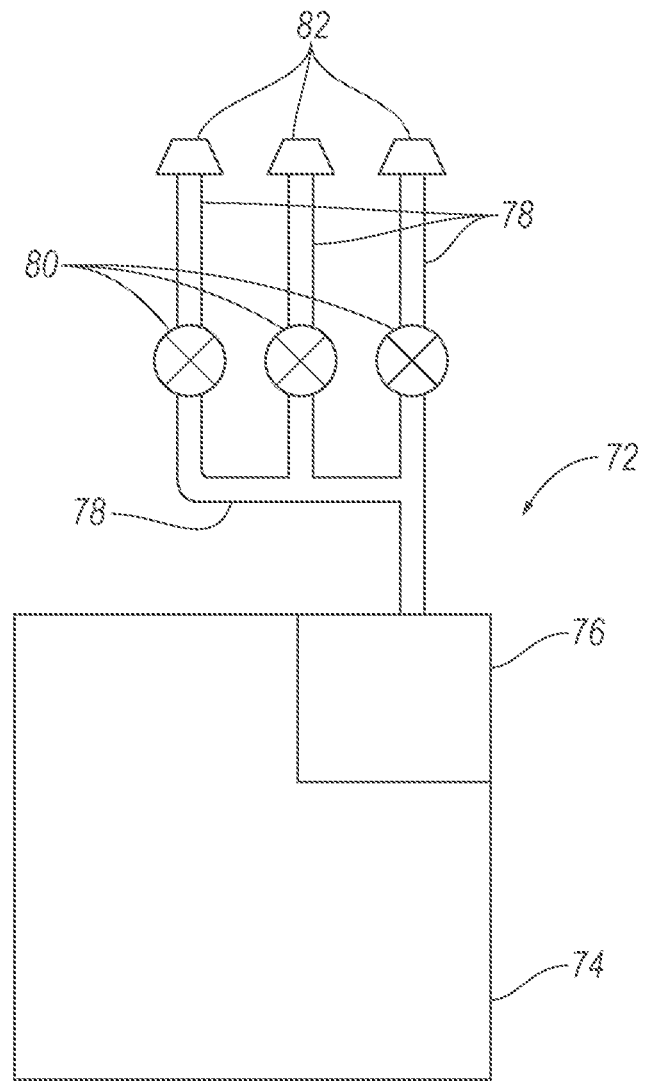
FIG. 6 is a diagram of an example cleaning system of the vehicle.

Turning now to FIG. 6, the vehicle 10 may include a liquid cleaning system 72. The liquid cleaning system 72 may include a reservoir 74, a pump 76, supply lines 78, valves 80, and fluid nozzles 82. The reservoir 74 and the pump 76 are fluidly connected (i.e., fluid can flow from one to the other) to each valve 80 and to each the fluid nozzle 82. The liquid cleaning system 72 distributes washer fluid stored in the reservoir 74 to the fluid nozzles 82. "Washer fluid" refers to any liquid stored in the reservoir 74 for cleaning. The washer fluid may include solvents, detergents, diluents such as water, etc.

The reservoir 74 may be a tank fillable with liquid, e.g., washer fluid for window cleaning. The reservoir 74 may be disposed in a front of the vehicle 10, specifically, in an engine compartment forward of a passenger cabin. Alternatively, the reservoir 74 may be disposed in the housing 28, e.g., in the chamber 34. The reservoir 74 may store the washer fluid only for supplying the sensor assembly 12 or also for other purposes, such as supply to the windshield.

The pump 76 forces the washer fluid through the supply lines 78 to the valves 80 and then to the fluid nozzles 82 with sufficient pressure that the washer fluid sprays from the fluid nozzles 82. The pump 76 is fluidly connected to the reservoir 74. The pump 76 may, for example, be attached to or disposed in the reservoir 74.

The supply lines 78 can extend from the pump 76 to the valves 80, and from the valves 80 to the fluid nozzles 82. A separate supply line 78 extends from each valve 80 to the respective fluid nozzle 82. The supply lines 78 may be, e.g., flexible tubes.

The valves 80 are independently actuatable to open and close, to permit the washer fluid to flow through or to block the washer fluid; i.e., each valve 80 can be opened or closed without changing the status of the other valves 80. Each valve 80 is positioned to permit or block flow from the reservoir 74 to a respective one of the fluid nozzles 82. The valves 80 may be any suitable type of valve, e.g., ball valve, butterfly valve, choke valve, gate valve, globe valve, etc.

Returning to FIG. 3, the fluid nozzles 82 may maintain clarity of a field-of-view of a respective sensor 14, e.g., liquid exiting the fluid nozzles 82 may clean the lenses 16 of the sensors 14. Each fluid nozzle 82 may be mounted to one respective casing 44, specifically to the top panel 50, e.g., the overhanging portion. The fluid nozzle 82 may be attached to the overhanging portion, e.g., in substantially the same manner as the air nozzle 18.

The fluid nozzle 82 is aimed across and at the lens 16 so that fluid strikes the lens 16 at a shallow angle, e.g., less than 10°. That is, the fluid nozzle 82 is aimed to direct fluid across the lens 16. Additionally, the fluid nozzle 82 may be aimed so that a direction of fluid from the fluid nozzle 82 is generally parallel to the ambient airflow $A_m$ during forward motion of the vehicle 10. This arrangement can help minimize interference of the fluid by the ambient airflow $A_m$ during forward motion of the vehicle 10.

The fluid nozzle 82 may be shaped to spray fluid in the flat-fan pattern (not shown). The fluid nozzle 82 has a direction of discharge (not shown) directed along a center of the spray pattern, i.e., bisecting the flat-fan pattern. The direction of discharge of the fluid nozzle 82 is in a radially inward direction with respect to the axis A, i.e., a direction that is toward the axis A.

The direction of discharge of the fluid nozzle 82 is different than, i.e., transverse to, the direction of airflow D of the air nozzle 18. For example, the fluid nozzle 82 may be circumferentially spaced from the air nozzle 18 about the axis A. As one example, the fluid nozzle 82 may be oblique to the air nozzle 18. This arrangement may assist in positioning the fluid nozzle 82 such that the fluid nozzle 82 does not interfere with the airflow from the air nozzle 18 and that sprayed fluid can contact the lens 16 at the desired shallow angle.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A sensor assembly, comprising:
    a sensor having a lens defining an axis;
    an air nozzle aimed to direct air across the lens and defining a direction of airflow along a longitudinal axis of the air nozzle, the longitudinal axis being transverse to the axis; and
    a plurality of baffles disposed in the air nozzle and spaced from each other, the baffles extending partially across the air nozzle relative to the axis;
    wherein the air nozzle includes sides spaced from each other along the axis; and
    the plurality of baffles extend from one side towards the other side.

2. The sensor assembly of claim 1, wherein the baffles are tapered in a direction opposite to the direction of airflow.

3. The sensor assembly of claim 2, wherein the baffles are tapered along the axis.

4. The sensor assembly of claim 1, wherein the baffles are tapered along the axis.

5. The sensor assembly of claim 1, wherein the baffles define respective baffle longitudinal axes extending substantially parallel to the longitudinal axis of the air nozzle.

6. The sensor assembly of claim 1, wherein the air nozzle defines a second axis transverse to the longitudinal axis and the axis, the respective baffles extending partially across the air nozzle relative to the second axis.

7. The sensor assembly of claim 6, wherein the baffles are spaced from each other along the second axis.

8. The sensor assembly of claim 6, wherein the baffles include respective widths extending along the second axis, the respective widths being substantially identical.

9. The sensor assembly of claim 6, wherein the air nozzle includes a top and a bottom spaced from each other along the second axis, the baffles being spaced from the top and the bottom.

10. The sensor assembly of claim 1, wherein the air nozzle includes an inlet and an outlet spaced from each other along the longitudinal axis, the plurality of baffles being disposed closer to the outlet than to the inlet.

11. The sensor assembly of claim 10, wherein the baffles including respective outlet surfaces facing the outlet, the outlet surfaces extending substantially parallel to the outlet.

12. The sensor assembly of claim 11, wherein the baffles include respective inlet surfaces facing the inlet, the inlet surfaces extending substantially parallel to the outlet surfaces.

13. The sensor assembly of claim 10, wherein the baffles are spaced from the outlet along the longitudinal axis.

14. The sensor assembly of claim 1, wherein the baffles include respective heights extending along the axis, the respective heights being substantially identical.

15. The sensor assembly of claim 1, wherein the baffles include respective lengths extending along the longitudinal axis, the respective lengths being substantially identical.

16. The sensor assembly of claim 1, wherein the plurality of baffles are mirror images of each other about the longitudinal axis.

17. The sensor assembly of claim 1, wherein the air nozzle is shaped to discharge air in a flat-fan pattern.

18. The sensor assembly of claim 1, further comprising a fluid nozzle aimed to direct fluid across the lens.

19. A sensor assembly, comprising:
    a sensor having a lens defining an axis;
    an air nozzle aimed to direct air across the lens and defining a direction of airflow along a longitudinal axis of the air nozzle, the longitudinal axis being transverse to the axis; and
    a plurality of baffles disposed in the air nozzle and spaced from each other, the baffles extending partially across the air nozzle relative to the axis;
    wherein the baffles are tapered along the axis.

20. A sensor assembly, comprising:
    a sensor having a lens defining an axis;
    an air nozzle aimed to direct air across the lens and defining a direction of airflow along a longitudinal axis of the air nozzle, the longitudinal axis being transverse to the axis; and
    a plurality of baffles disposed in the air nozzle and spaced from each other, the baffles extending partially across the air nozzle relative to the axis;

wherein the baffles define respective baffle longitudinal axes extending substantially parallel to the longitudinal axis of the air nozzle.

\* \* \* \* \*